US011916332B2

(12) United States Patent
Chen

(10) Patent No.: US 11,916,332 B2
(45) Date of Patent: Feb. 27, 2024

(54) ELECTRICAL CONNECTOR HAVING HOLDING MEMBER WITH A REINFORCING TAB AND A RESILIENT ARM

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventor: Ming-Ching Chen, New Taipei (TW)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 118 days.

(21) Appl. No.: 17/577,134

(22) Filed: Jan. 17, 2022

(65) Prior Publication Data

US 2022/0247123 A1 Aug. 4, 2022

(30) Foreign Application Priority Data

Jan. 30, 2021 (CN) ......................... 202120263810.1

(51) Int. Cl.

*H01R 13/627* (2006.01)
*H01R 12/71* (2011.01)
*H01R 24/60* (2011.01)

(52) U.S. Cl.

CPC ....... *H01R 13/6273* (2013.01); *H01R 12/716* (2013.01); *H01R 24/60* (2013.01)

(58) Field of Classification Search

None

See application file for complete search history.

(56) References Cited

U.S. PATENT DOCUMENTS

| | | | |
|---|---|---|---|
| 9,331,410 B2 | 5/2016 | Obikane et al. | |
| 9,899,771 B2 | 2/2018 | Ashibu et al. | |
| 9,997,852 B2 | 6/2018 | Chen | |
| 10,446,985 B2 | 10/2019 | Ooi | |
| 10,651,581 B1 | 5/2020 | Sasayama et al. | |
| 10,910,745 B2 | 2/2021 | Hosoda | |
| 11,158,968 B2 | 10/2021 | Tanaka et al. | |
| 2016/0036145 A1* | 2/2016 | Hasegawa .......... | H01R 12/7076 439/78 |

(Continued)

FOREIGN PATENT DOCUMENTS

| | | |
|---|---|---|
| CN | 209571614 U | 11/2019 |
| CN | 108390213 B | 10/2021 |

*Primary Examiner* — Oscar C Jimenez
(74) *Attorney, Agent, or Firm* — Ming Chieh Chang

(57) ABSTRACT

An electrical connector includes: an insulative housing having an island and a receiving channel; plural contacts secured to the insulative housing and exposed to the receiving channel; and a pair of holding members secured to two opposite ends of the insulative housing and exposed to the receiving channel, each holding member having a first part and a second and third parts at two opposite ends of the first part, wherein the second part of each holding member has a bottom plate, a reinforcing tab extending upwardly from the bottom plate, and a resilient arm extending upwardly from the bottom plate and located proximal to associated third part than the reinforcing tab.

4 Claims, 10 Drawing Sheets

(56) References Cited

U.S. PATENT DOCUMENTS

| | | | | |
|---|---|---|---|---|
| 2016/0064843 | A1* | 3/2016 | Hasegawa | H01R 12/716 439/65 |
| 2018/0358729 | A1 | 12/2018 | Chen | |
| 2019/0363467 | A1* | 11/2019 | Ko | H01R 13/5045 |
| 2021/0143567 | A1* | 5/2021 | Someya | H01R 12/57 |
| 2021/0359474 | A1 | 11/2021 | Oosaka | |
| 2022/0052468 | A1* | 2/2022 | Chang | H01R 12/716 |

* cited by examiner

ELECTRICAL CONNECTOR HAVING HOLDING MEMBER WITH A REINFORCING TAB AND A RESILIENT ARM

BACKGROUND OF THE INVENTION

1. Field of the Invention

The present invention relates to an electrical connector having power contacts and holding members also acting as power contacts and more particularly to a structure of adjacent power contacts and holding members that are interconnected to decrease temperature rise in conducting large current.

2. Description of Related Art

U.S. Pat. Nos. 9,899,771 and 11,158,968 each disclose an electrical connector including an insulative housing having an island and a receiving channel, a plurality of contacts secured to the insulative housing and exposed to the receiving channel, and a pair of holding members secured to two opposite ends of the insulative housing and exposed to the receiving channel, each holding member having a first part and a second and third parts at two opposite ends of the first part, each first part including integrally formed features like reinforcing tab and resilient arm.

SUMMARY OF THE INVENTION

An electrical connector comprises: an insulative housing having an island and a receiving channel; a plurality of contacts secured to the insulative housing and exposed to the receiving channel; and a pair of holding members secured to two opposite ends of the insulative housing and exposed to the receiving channel, each holding member having a first part and a second and third parts at two opposite ends of the first part, wherein the second part of each holding member has a bottom plate, a reinforcing tab extending upwardly from the bottom plate, and a resilient arm extending upwardly from the bottom plate and located proximal to associated third part than the reinforcing tab.

DETAILED DESCRIPTION OF THE PREFERRED EMBODIMENT

Figure 1:
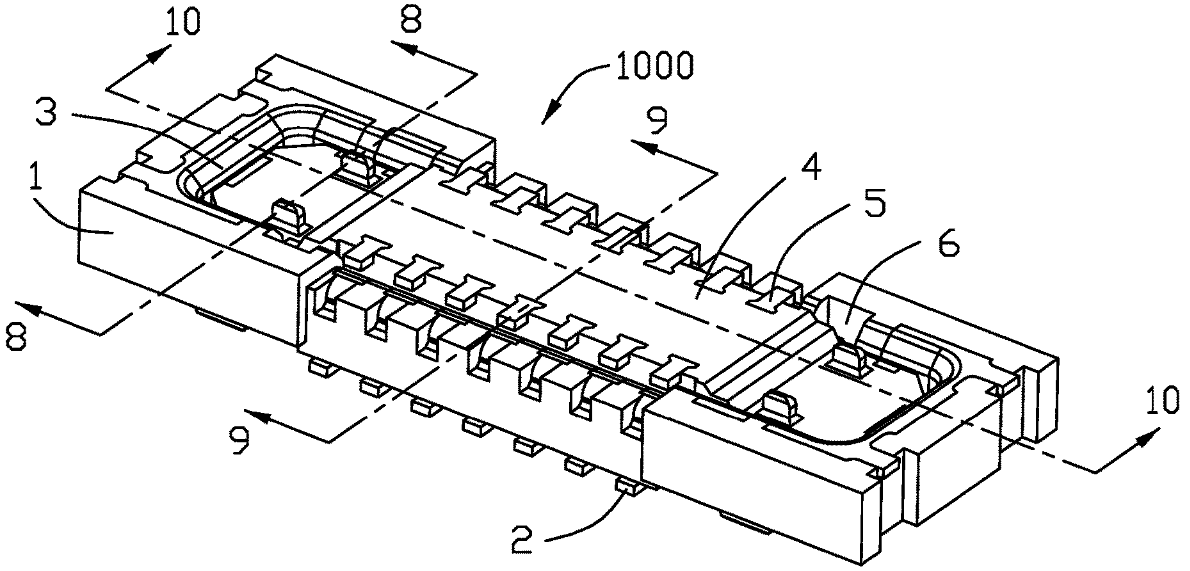
FIG. 1 is a perspective view of an electrical connector assembly in accordance with the present invention.
Figure 2:
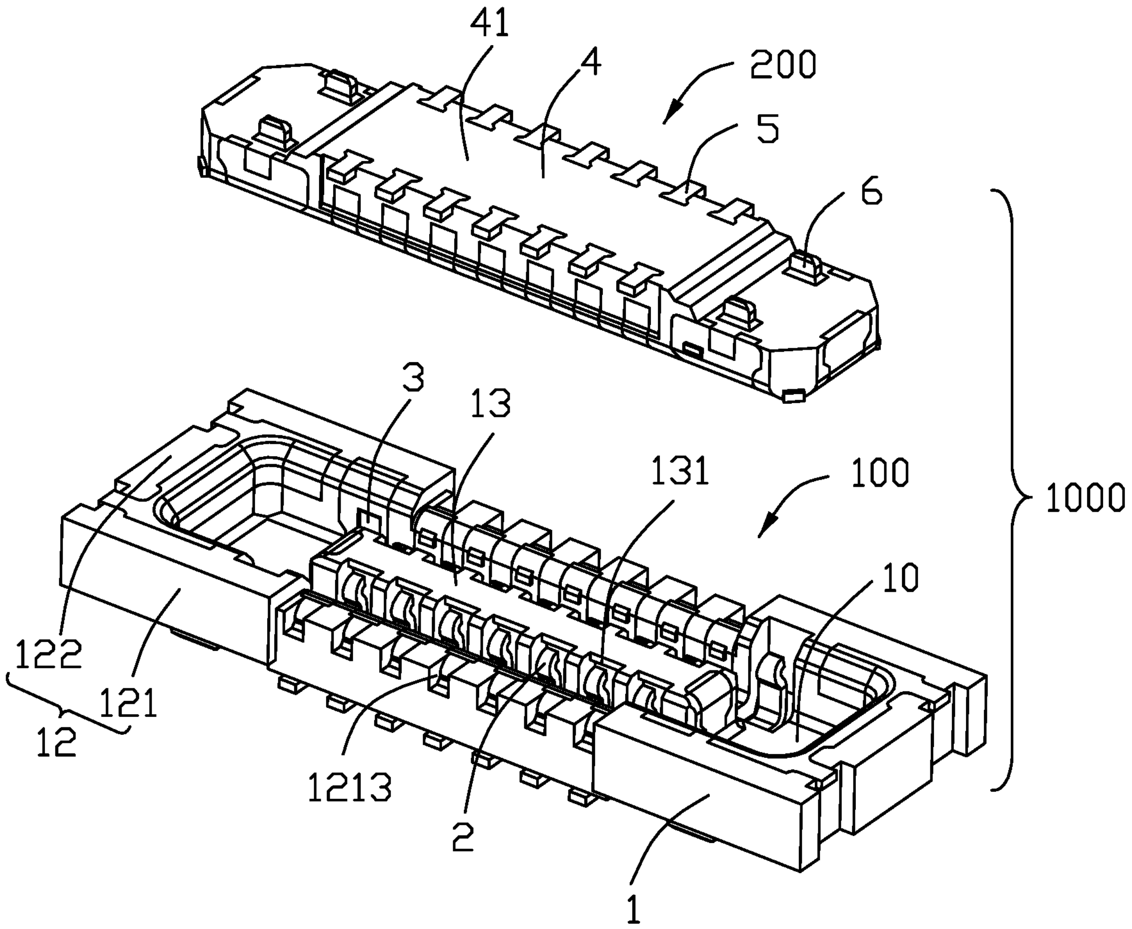
FIG. 2 is an exploded view of the electrical connector assembly.
Figure 3:
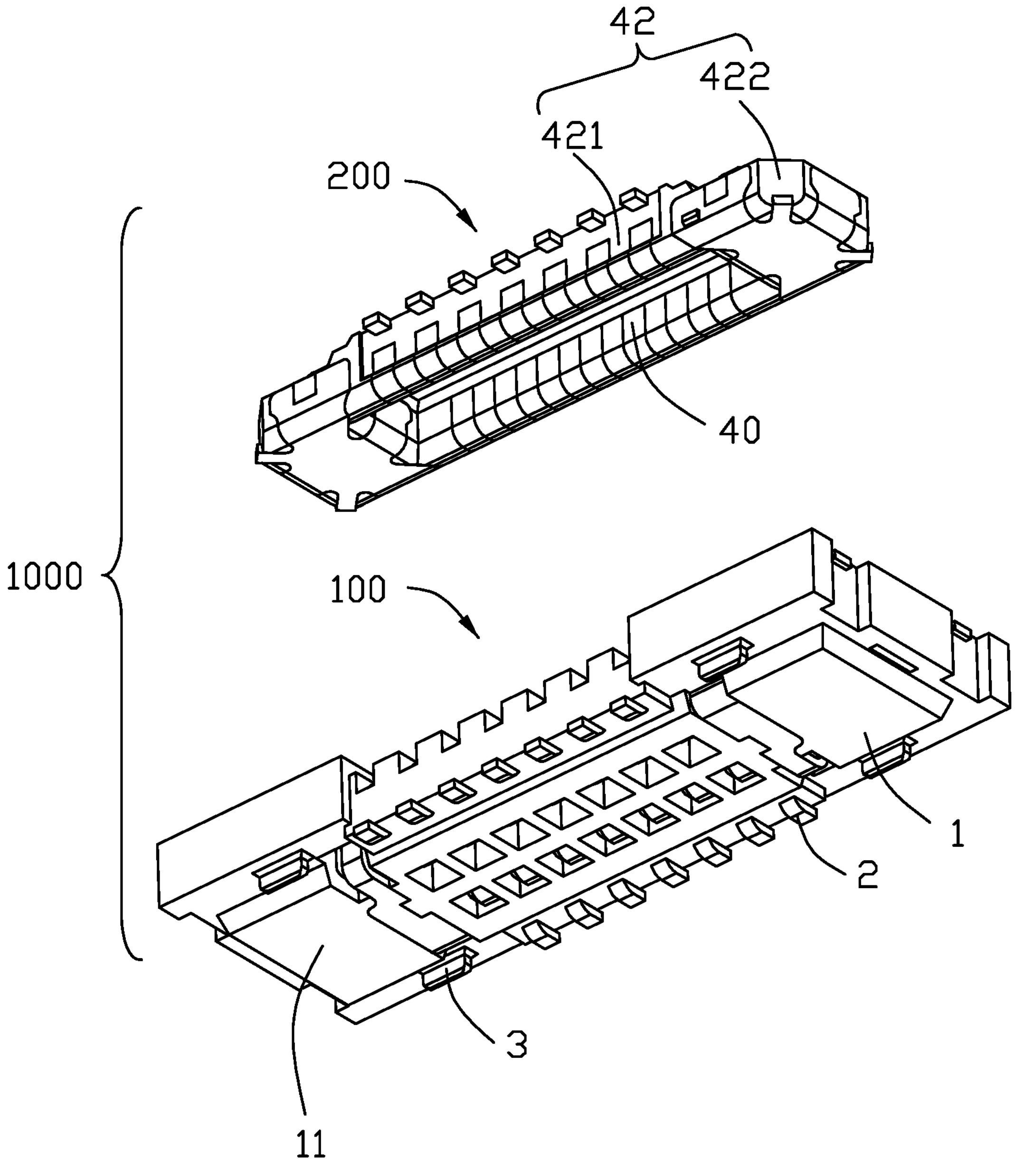
FIG. 3 is another exploded view of the electrical connector assembly.
Figure 4:
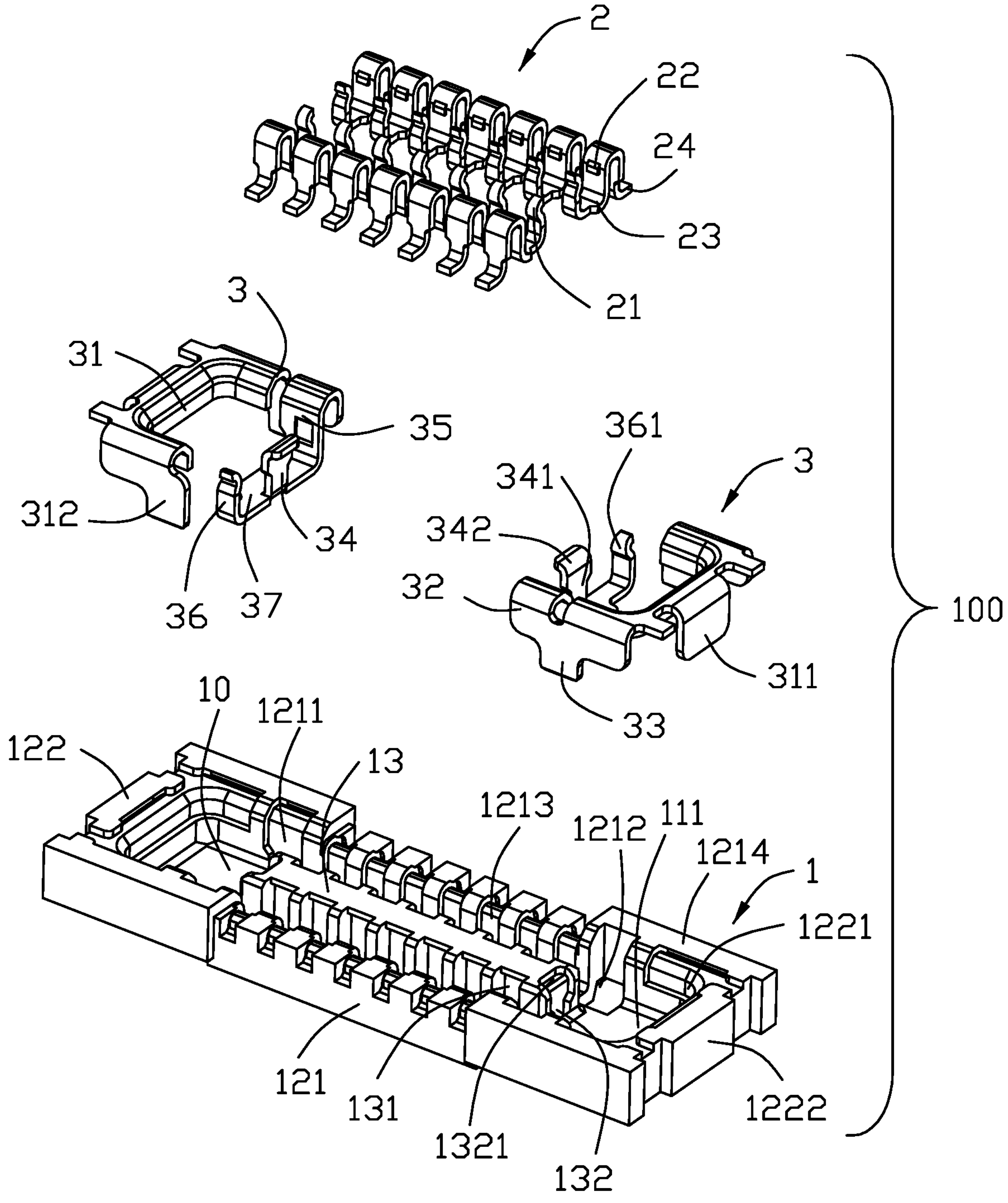
FIG. 4 is an exploded view of an electrical connector of the electrical connector assembly.
Figure 5:
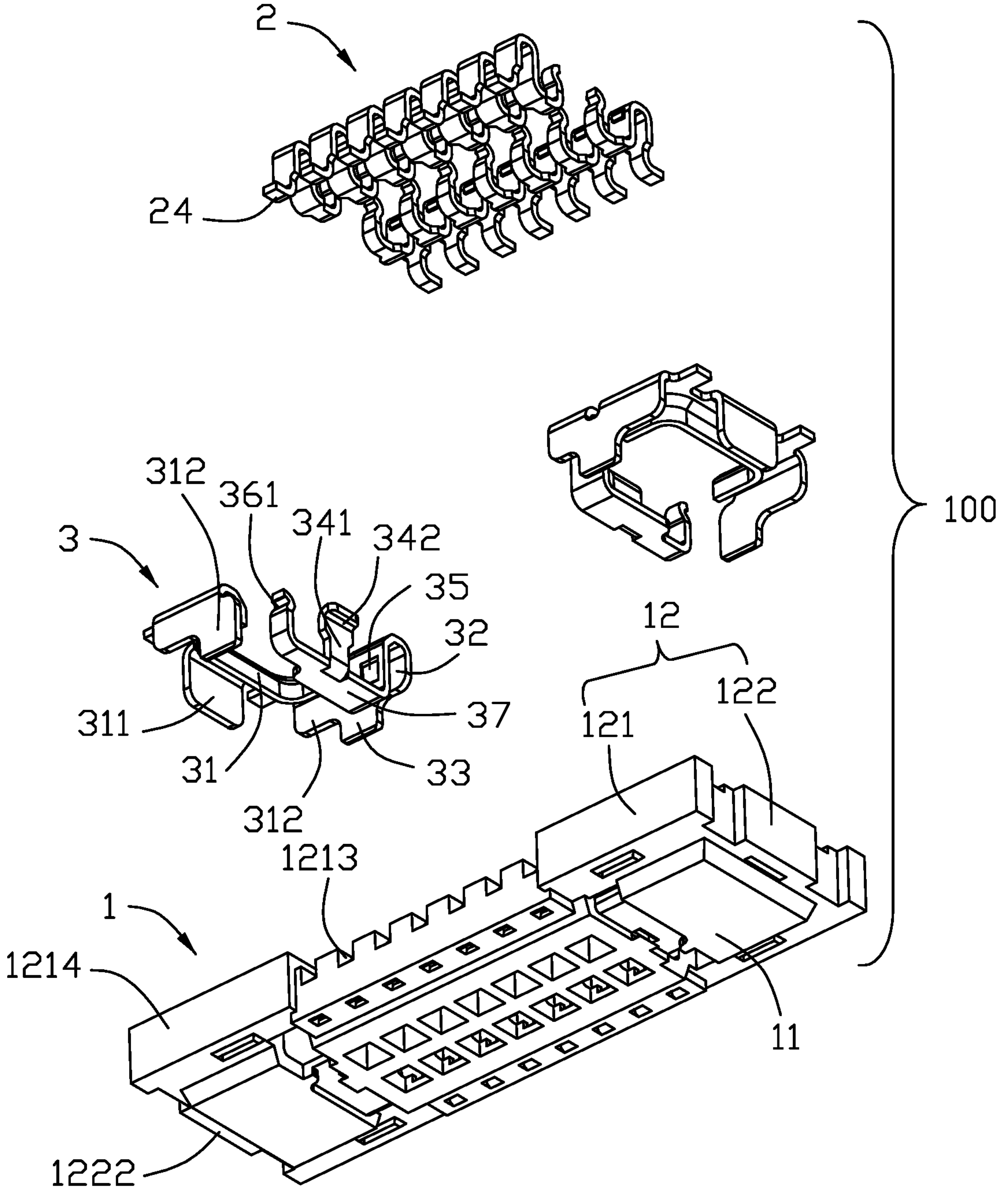
FIG. 5 is another exploded view of the electrical connector.
Figure 6:
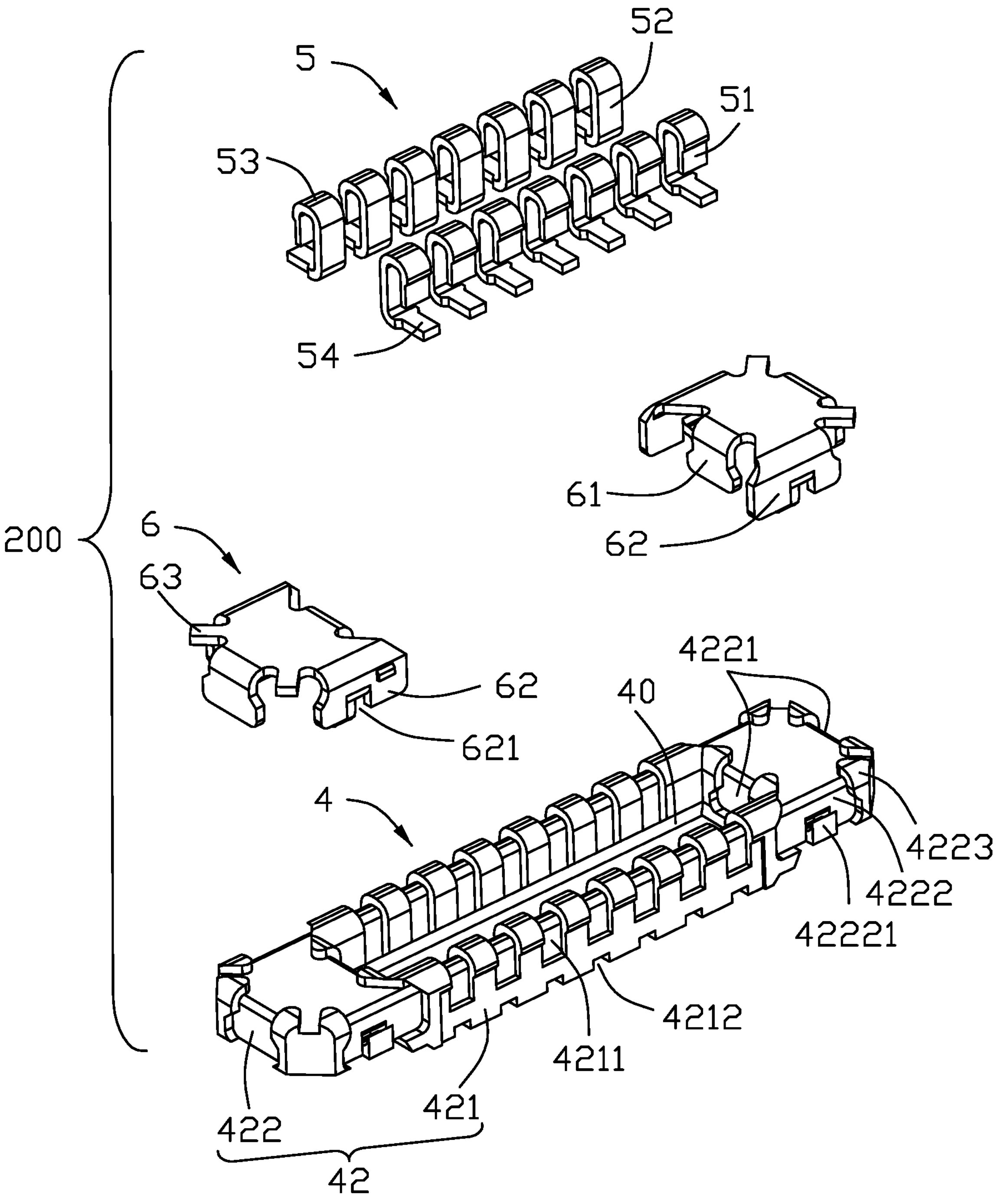
FIG. 6 is an exploded view of a mating electrical connector of the electrical connector assembly.
Figure 7:
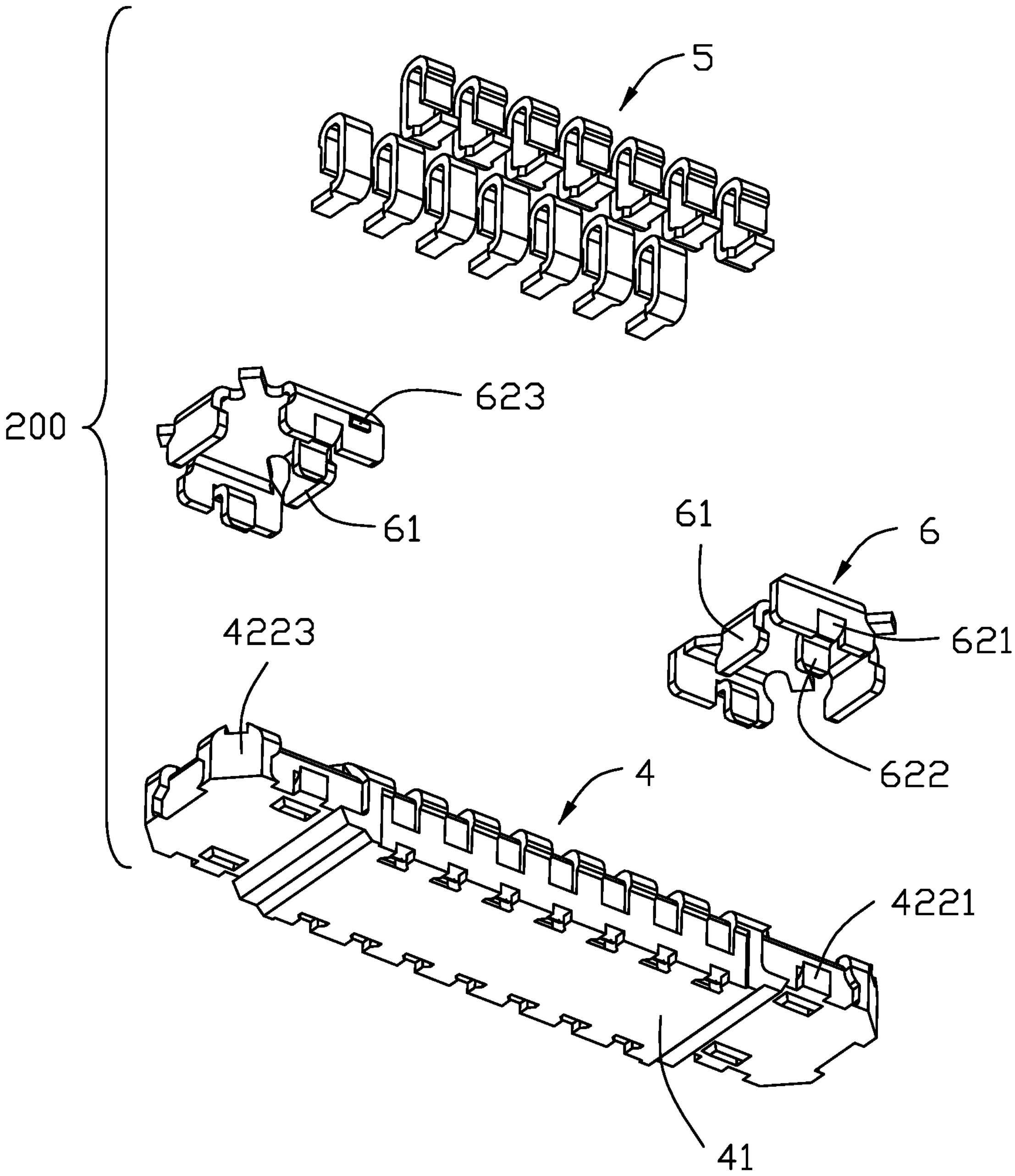
FIG. 7 is another exploded view of the mating electrical connector.
Figure 8:
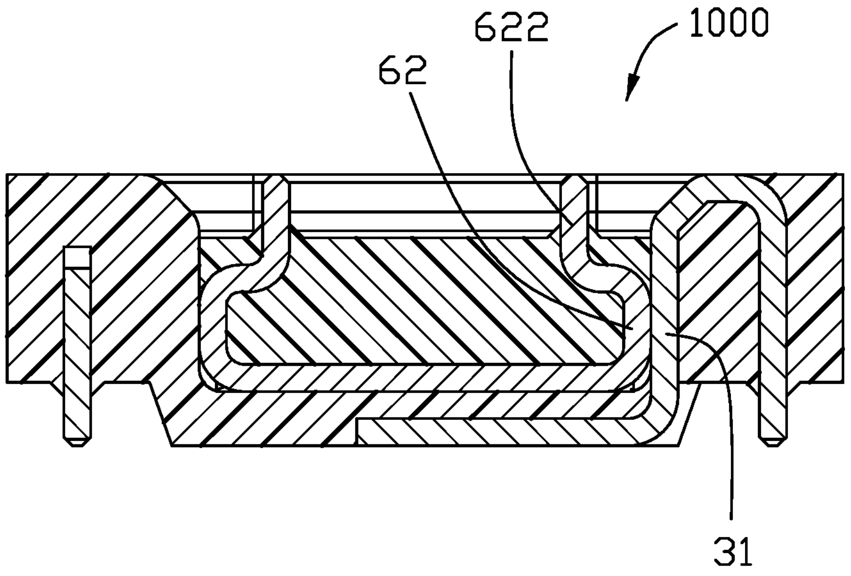
FIG. 8 is a cross-sectional view of the electrical connector assembly taken along line A-A in FIG. 1.
Figure 9:
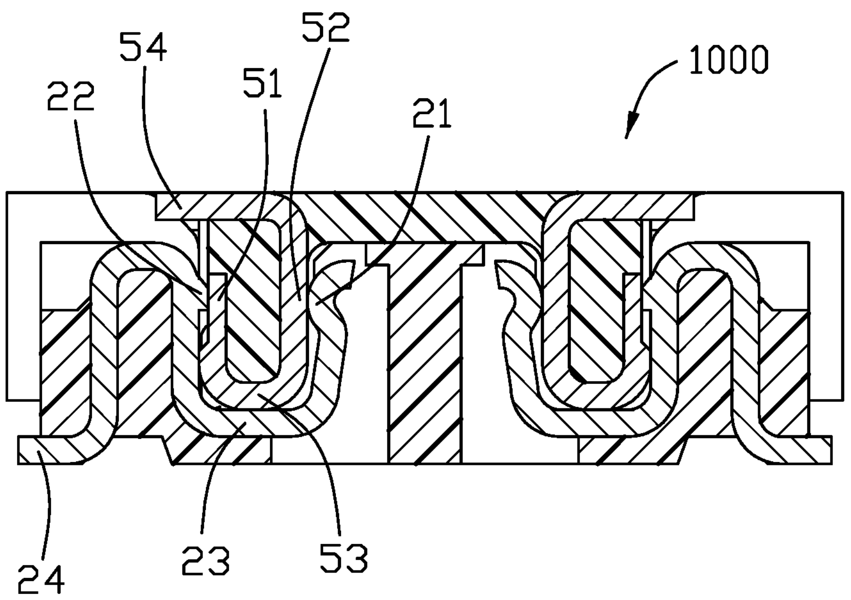
FIG. 9 is a cross-sectional view of the electrical connector assembly taken along line B-B in FIG. 1.
Figure 10:
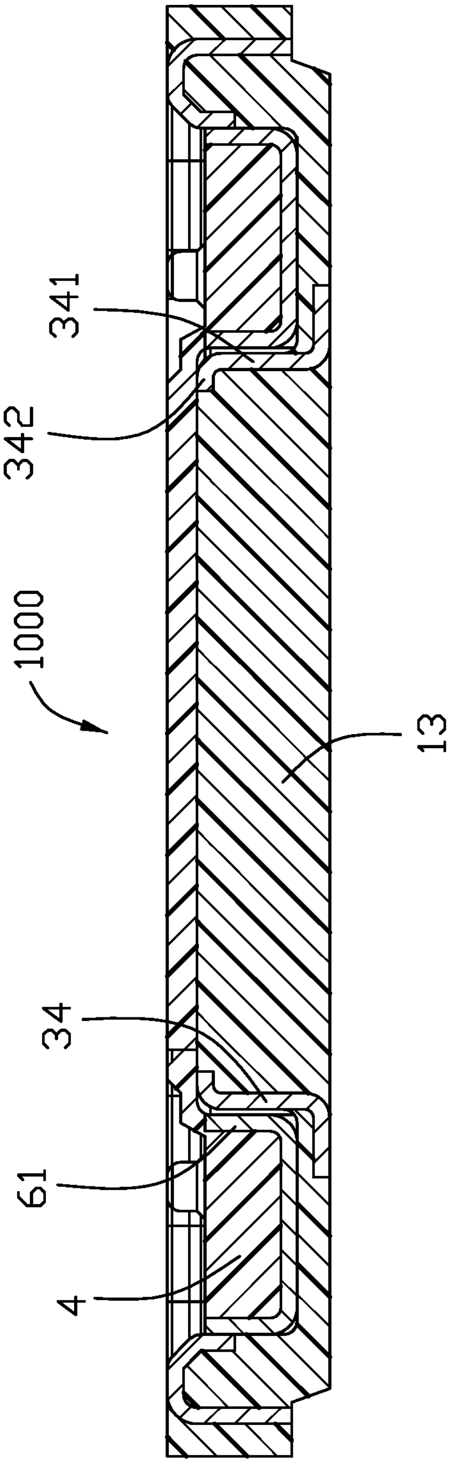
FIG. 10 is a cross-sectional view of the electrical connector assembly taken along line C-C in FIG. 1.

Referring to FIGS. 1-10, an electrical connector assembly 1000 includes an electrical connector 100 and a mating electrical connector 200 to be mounted on printed circuit boards (not shown). The electrical connector 100 includes an elongate insulative housing 1 having an island 13 and a receiving channel 10, a plurality of contacts 2 secured to the insulative housing 1 and exposed to the receiving channel 10, and a pair of holding members 3 secured to two opposite ends of the insulative housing 1 and exposed to the receiving channel 10. The mating electrical connector 200 includes an elongate insulative housing 4 having a receiving space 40, a plurality of contacts 5 secured to the insulative housing 4 and exposed to the receiving space 40, and a pair of holding elements 6 secured to two opposite ends of the insulative housing 4 and exposed to the receiving space 40.

The insulative housing 1 has a base 11 and a peripheral wall 12, which together with the island 13 define the receiving channel 10. The contacts 2 are arranged, e.g., insert-molded, with the insulative housing 1 in two rows in a manner known in this art. The pair of holding members 3 are also preferably insert-molded with the insulative housing 1.

To protect the island 13 of the insulative housing 1 from damage during mating/un-mating the connectors 100 and 200, the holding member 3 has a reinforcing tab 34 integrated to and exposed at the island 13.

The peripheral wall 12 includes a pair of longitudinal walls 121 and a pair of lateral walls 122. Each longitudinal wall 121 has plural contact grooves 1213, first and second slots 1211 and 1212 at two opposite sides of the grooves 1213, and two end portions 1214. Each lateral wall 122 has an inner curved portion 1221 and an outer end portion 1222. The insulative housing 1 further includes a receiving room 111 defined between the inner curved portion 1221 and the island 13.

The island 13 of the insulative housing 1 has plural contact grooves 131 corresponding to the grooves 1213 and two retaining grooves 1321 at two opposite ends 132 thereof. Each contact 2 has a contacting portion 21 movable in the groove 131, an abutting portion 22 secured in the groove 1213, a connecting portion 23, and a soldering tail 24 extending from the abutting portion 22.

Each holding member 3 has a first part 31 retained to the lateral wall 122 and a second and third parts at two opposite ends of the first part 31. The first part 31 is retained at the inner curved portion 1221. The second part has a bottom plate 37 and the reinforcing tab 34 extends upwardly from the bottom plate 37. The second part further has a resilient arm 36 extending upwardly from the bottom plate 37 and located proximal to associated third part than the reinforcing tab 34. The reinforcing tab 34 is retained in the groove 1321. The resilient arm 36 is accommodated in the second slot 1212. The first part 31 has a first extension 311, the second part has a second extension 33, and the third part has a third extension 312. The second part extends from an outer portion 32 thereof to an inner portion 35 thereof to then form the bottom plate 37. The reinforcing tab 34 has a lower vertical portion 341 and an upper curved portion 342. The resilient arm 36 has an upper curved portion 361.

Referring specifically to FIGS. 6-10, the insulative housing 4 of the mating electrical connector 200 has a base 41 and a peripheral wall 42, which together define the receiving space 40. The peripheral wall 42 includes a pair of longitudinal walls 421 and a pair of end blocks 422. Each longitudinal wall 421 has plural contact grooves 4211 and corresponding recesses 4212. Each end block 422 is formed with a pair of first recessed portions 4221, a pair of second recessed portions 4222, and two corners 4223, and each second recessed portion 4222 is formed with a protrusion 42221, after insert-molding the pair of holding elements 6.

The contacts 5 are insert-molded with the insulative housing 4 in two rows in a manner known in this art. Each contact 5 has an outer contacting portion 51, an inner contacting portion 52, a connecting portion 53, and a soldering tail 53 extending from the inner contacting portion 52.

Each holding element 6 has a pair of first plates 61 retained in the first recessed portions 4221, a pair of second plates 62 retained in the second recessed portions 4222, and a pair of fingers 63. Each second plate 62 has an upper portion 621 and a lower portion 622. One of the pair of second plates 62 has a protrusion 623 to engage a corresponding recess provided on the inner portion 35 of the holding member 3.

When the connectors 100 and 200 are mated, the pair of first plates 61 are received between the first part 31 and the reinforcing tab 34 of the holding member 3; the protrusion 623 of one second plate 62 engages the inner portion 35 of the holding member 3 while the other second plate 62 engages the resilient arm 36 of the holding member 3.

What is claimed is:

1. An electrical connector comprising:

an insulative housing having an island and a receiving channel;

two rows of contacts secured to the insulative housing and exposed to the receiving channel; and a pair of holding members secured to two opposite ends of the insulative housing and exposed to the receiving channel, each holding member having a first part and a second and third parts at two opposite ends of the first part; wherein the second part of each holding member has a bottom plate, a reinforcing tab extending upwardly from the bottom plate, and a resilient arm extending upwardly from the bottom plate and located proximal to associated third part than the reinforcing tab; and the resilient arm of each holding member is aligned with a corresponding row of contacts.

2. The electrical connector as claimed in claim 1, wherein the pair of holding members are insert-molded with the insulative housing, and the reinforcing tab is integrated to and exposed at the island of the insulative housing.

3. An electrical connector assembly comprising:

a first connector including:

an insulative housing having an island and a receiving channel;

a plurality of contacts secured to the insulative housing and exposed to the receiving channel; and a pair of holding members secured to two opposite ends of the insulative housing and exposed to the receiving channel, each holding member having a first part and a second and third parts at two opposite ends of the first part, the second part having a bottom plate, a reinforcing tab extending from the bottom plate, and a resilient arm extending from the bottom plate and located proximal to associated third part than the reinforcing tab; and a second connector including:

an insulative housing;

a plurality of contacts secured to the insulative housing; and a pair of holding elements secured to two opposite ends of the insulative housing; wherein each holding element has a pair of first plates opposite to each other and a pair of second plates opposite to each other;

the pair of first plates are to be received between and in direct contact with the first part and the reinforcing tab of the holding member; and one of the pair of second plates is to engage the second part of the holding member and the other second plate is to engage the resilient arm of the holding member.

4. The electrical connector assembly as claimed in claim 3, wherein the plurality of contacts of the first connector are arranged in two rows, and the resilient arm of each holding member is aligned with a corresponding row of contacts.

* * * * *